United States Patent [19]

Li et al.

[11] Patent Number: 5,594,241
[45] Date of Patent: Jan. 14, 1997

[54] APPARATUS AND METHOD FOR JITTER ATTENUATION IN ROTARY ENCODERS

[75] Inventors: Zhixin Li, Hudson; Steve Ham, Nashua, both of N.H.

[73] Assignee: Ferrofluidics Corporation, Nashua, N.H.

[21] Appl. No.: 384,941

[22] Filed: Feb. 7, 1995

[51] Int. Cl.⁶ ..................................................... G01D 5/34
[52] U.S. Cl. ................................ 250/231.17; 250/231.14
[58] Field of Search ....................... 250/231.17, 231.14, 250/231.13, 231.16, 237 G; 341/11, 13, 15; 338/32 R; 324/207.21, 207.24, 252; 364/571.06, 565

[56] References Cited

U.S. PATENT DOCUMENTS

| | | | |
|---|---|---|---|
| 4,593,193 | 6/1986 | Michaelis | 250/231.14 |
| 4,633,423 | 12/1986 | Bailey | 364/571.06 |
| 5,264,844 | 11/1993 | Itou et al. | 341/11 |

Primary Examiner—Que T. Le
Attorney, Agent, or Firm—Bookstein & Kudirka, P.C.

[57] ABSTRACT

A signal conditioning unit receives index and data signals from a rotary incremental encoder, and attenuates the pulse-to-pulse jitter of the data signal by passing the data signal through an AND gate having at least two of its inputs tied to the data signal to provide a jitter attenuated data signal. Zero-delay jitter riding on the index signal is attenuated by ANDing together the index signal and the jitter attenuated data signal to provide a jitter attenuated index signal. The jitter attenuated index signal is then processed to extend the active state of the signal to match the duration of the active state of the index signal, and thus provide a synthesized jitter attenuated index signal. To account for the propagation/processing delay associated with extending the active duration of the jitter attenuated index signal, the jitter attenuated data signal is delayed to provide the proper timing relationship between the processed jitter and index signals. The signal conditioning unit of the present invention improves the position and velocity accuracy of the rotary incremental encoder supplied signals since the jitter is attenuated from the index and data signals, which improves the positioning and control accuracy of the control system which acts upon these signals.

25 Claims, 5 Drawing Sheets

FIGURE 4B

APPARATUS AND METHOD FOR JITTER ATTENUATION IN ROTARY ENCODERS

FIELD OF THE INVENTION

This invention relates to rotary encoders and more particularly to a signal conditioning unit for attenuating jitter on signals from an incremental rotary encoder.

BACKGROUND OF THE INVENTION

Rotary encoders are the sensor of choice for generating a digital output to provide an accurate measurement of motion in terms of shaft angle position, velocity and direction of rotation. Encoders are often attached to high performance spindles in pre-press imagesetters systems, laser beam scanning systems, and high precision machine tools, etc. High accuracy spindles used in precision machine tools and laser scanning systems typically utilize a closed loop control system to achieve accurate speed control and rotor position registration.

The encoder typically has two or three signal channels, one of which is generally a one-pulse-per-revolution index channel, other signals being multiple-pulse-per-revolution data channels. The number of pulses per revolution of a data channel are typically between a few hundred to a few thousand depending on the resolution required for fine positional control. These signals are input to the control system to provide real-time feedback information on the position, velocity and rotational direction of the spindle.

The index channel pulse is used to indicate the beginning of each spindle revolution and the data channel(s) signal is used to show the angular position of the rotor within a revolution and the speed of the rotor. Usually the index channel is referred to as the "I" channel and the data channel is referred to as the "A" channel. For some types of encoders (such as quadrature type) there is an additional data channel referred to as the "Q" channel which provides information on the direction of spindle rotation.

To achieve high accuracy in speed and positional control, the timing variances (jitter) of the pulses have to be minimized. There are many types of jitters and one of the primary contributors to the jitters is caused by electrical noise which is coupled onto the index and data channel signals. The electrical noise causes spurious variations in the duration of a pulse since it effects the rising and falling edge transitions. Two known time related types of jitters are Zero-Delay Index-to-Data Jitter (zero-delay jitter) and Data-Pulse-to-Data-Pulse Jitter (pulse-to-pulse jitter or pulse-separation jitter).

The amount of zero-delay jitter for a typical encoder is in the range of 20 to 200 nanoseconds. It has been the industry practice to either: 1) tolerate this amount of jitter which translates into positional or speed errors which may not be acceptable for high accuracy applications, or 2) reduce the jitter at the price of significant signal distortion. Such signal distortion may cause signal recognition problems which introduces additional errors by erroneously placing the signal pulse(s) in an non-desirable position which limits the performance of the encoder during high speed operation.

The electrical noise also contributes to pulse-to-pulse jitter of the encoder data pulses which introduces certain positional errors into the control system.

Figure 1A:
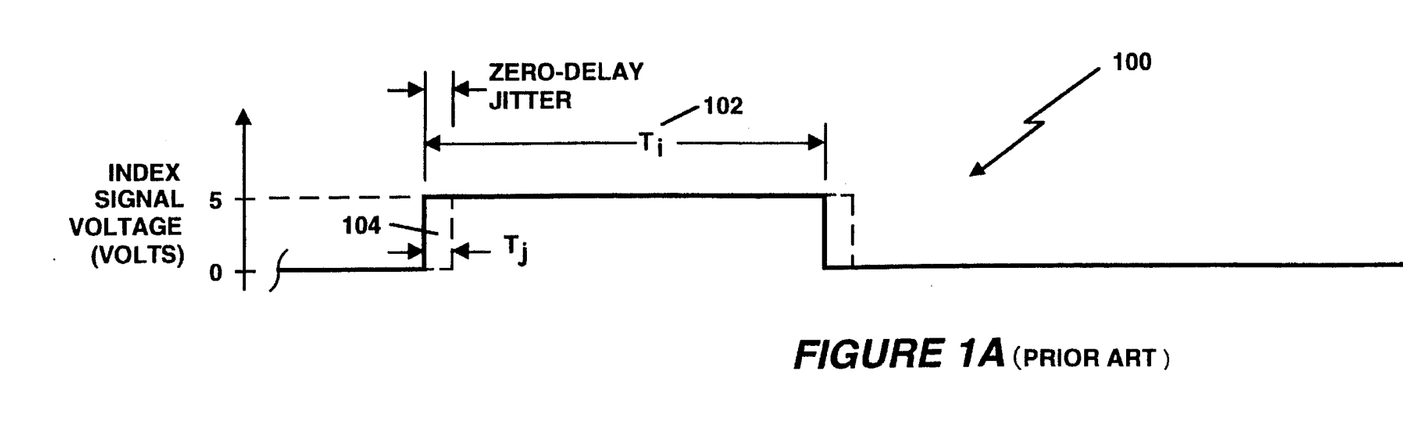
FIG. 1A is an illustration of jitter on an index signal from an incremental rotary encoder.
Figure 1B:
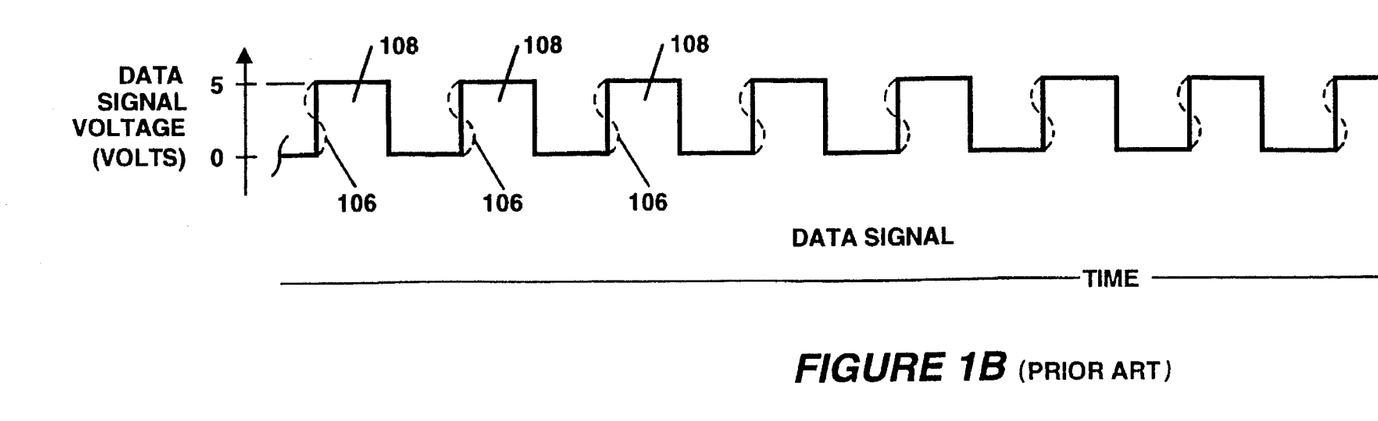
FIG. 1B is an illustration of jitter on a data signal from an incremental rotary encoder.

FIG. 1A illustrates a prior art index pulse signal 100 of duration $T_i$ 102 having jitter 104 on the rising edge of the pulse. Voltage is plotted along the vertical axis and time is plotted along the horizontal axis. The rising edge of the index pulse signal 100 is used to indicate the beginning of a shaft revolution. A problem with the jitter 104 is that it may cause the index pulse signal rising edge to transition to the high state up to, for example, about 200 nanoseconds before or after its ideal transition time. Similarly, FIG. 1B illustrates jitter 106 in the form of electrical noise on the rising edge of a series of data pulses 108.

The timing variance caused by the jitter can lead to position and speed control inaccuracies which lead to control problems, such as introducing non-linearities into the control system.

Therefore, it is always desirable to keep zero-delay jitter and pulse-to-pulse jitter to a minimum.

SUMMARY OF THE INVENTION

An object of the present invention is improve the signal quality from an incremental rotary encoder to increase the position and speed accuracy of the signals from the encoder.

Another object of the present invention is to reduce the jitter on an index signal of an incremental rotary encoder.

Yet another object of the present invention is to reduce the jitter on data signals of an incremental rotary encoder.

Briefly, a signal conditioning unit receives index and data signals from a rotary incremental encoder, and attenuates the pulse-to-pulse jitter of the data signal by passing the data signal through an AND gate having at least two of its inputs tied to the data signal to provide a jitter attenuated data signal. Zero-delay jitter on the index signal is also attenuated by ANDing together the index signal and the jitter attenuated data signal to provide a jitter attenuated index signal.

The jitter attenuated index signal is also processed to extend its active state to match the active duration of the index signal, and thus provide a synthesized jitter attenuated index signal. To account for the propagation/processing delay associated with extending the active duration of the jitter attenuated index signal, the jitter attenuated data signal is delayed to provide the proper timing relationship between the processed data and index signals.

The signal conditioning unit of the present invention improves the position and velocity accuracy of the index and data signals since the jitter is attenuated from both the index and data signals, thus improving the positioning and control accuracy of the control system which acts upon these signals.

The signal conditioning unit attenuates the zero-delay jitter of the index signal from the rotary incremental encoder with minimum distortion to the original index signal characteristics. Similarly, the pulse-to-pulse jitter of the data signal is attenuated by the signal conditioning unit with minimum distortion to the data signal characteristics. As a result, the data signal accurately represents the true relative angular mechanical position and speed of the spindle rotor on which the encoder is placed, and the index signal provides an accurate representation of the absolute spindle rotor position, once every revolution of the rotor.

The signal conditioning unit can either be packaged in the encoder housing or packaged as a separate unit to improve the accuracy of existing incremental rotary encoders. The signal conditioning unit may also be housed with the control system electronics or with other system components depending upon the overall system architecture.

The signal conditioning unit of the present invention is a low cost, low power, high reliability system due to its elegant simplicity which enhances the accuracy of signals supplied from rotary incremental encoders.

BRIEF DESCRIPTION OF THE DRAWINGS

The above and further advantages of the invention may be better understood by referring to the following description in conjunction with the accompanying drawings and which.

DESCRIPTION OF A PREFERRED EMBODIMENT

Figure 2:
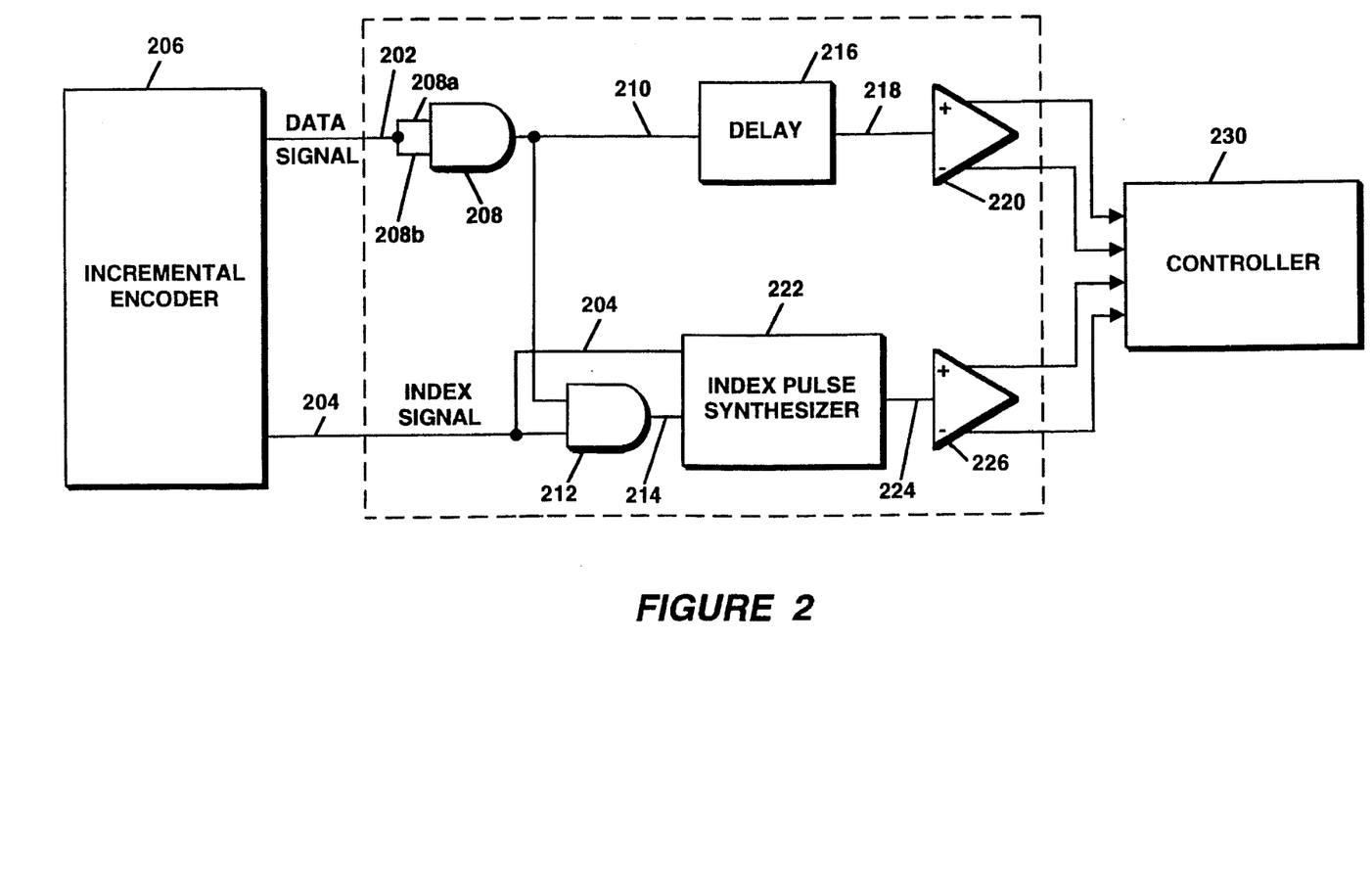
FIG. 2 is a block diagram of a signal conditioning unit of the present invention receiving an index signal and a data signal from an incremental rotary encoder and providing jitter attenuated index and data signals to a controller.

FIG. 2 illustrates a block diagram of a signal conditioning unit 200 which receives a data pulse signal on a line 202 and an index pulse signal on a line 204 from an incremental encoder 206. The data signal on the line 202 has a frequency indicative of the speed of a rotating shaft (not shown) coupled to the encoder 206. The index signal on the line 204 includes a single output pulse for each shaft revolution that provides an absolute reference signal for the shaft position. As discussed earlier with respect to FIGS. 1A–1B, both the data signal and the index signal contain unwanted pulse duration jitter.

The signal conditioning unit 200 processes the data signal and the index signal to attenuate the jitter from both signals. The data signal is input to two or more inputs 208a, 208b of an AND gate 208 which removes the pulse-to-pulse jitter on the data signal and provides a jitter attenuated data signal on a line 210. The AND gate 208 attenuates the pulse-to-pulse jitter since part of the jitter is caused by high frequency electrical noise riding on the data signal. By inputting the data signal to two or more inputs 208a, 208b of the AND gate, the jitter caused by the electrical noise may not affect the output signal on the line 210, since the phase of the jitter at each of the AND gate inputs 208a, 208b will be slightly different. The AND gate 208 may be a two input AND gate, such as, an AND gate available on the TTL integrated circuit component 74LS08, available from a number of semiconductor manufacturers including Texas Instruments.

The signal conditioning unit 200 also receives the index signal on the line 204 and inputs the signal to an AND gate 212 along with the jitter attenuated data signal on the line 210. ANDing together the raw index signal on the line 204 and the jitter attenuated data signal on the line 210 attenuates the jitter from the index signal, thus providing a jitter attenuated index signal on a line 214. The AND gate 212 may, for example, be a two input AND gate such as one of the AND gates available on the 74LS08 integrated circuit. It is contemplated that in another embodiment of the invention (not shown), it may be necessary to only attenuate the jitter on the index signal. Thus, AND gate 208 would be eliminated and the data signal on the line 202 would be input to the AND gate 212 rather than the jitter attenuated data signal.

Figure 3A:
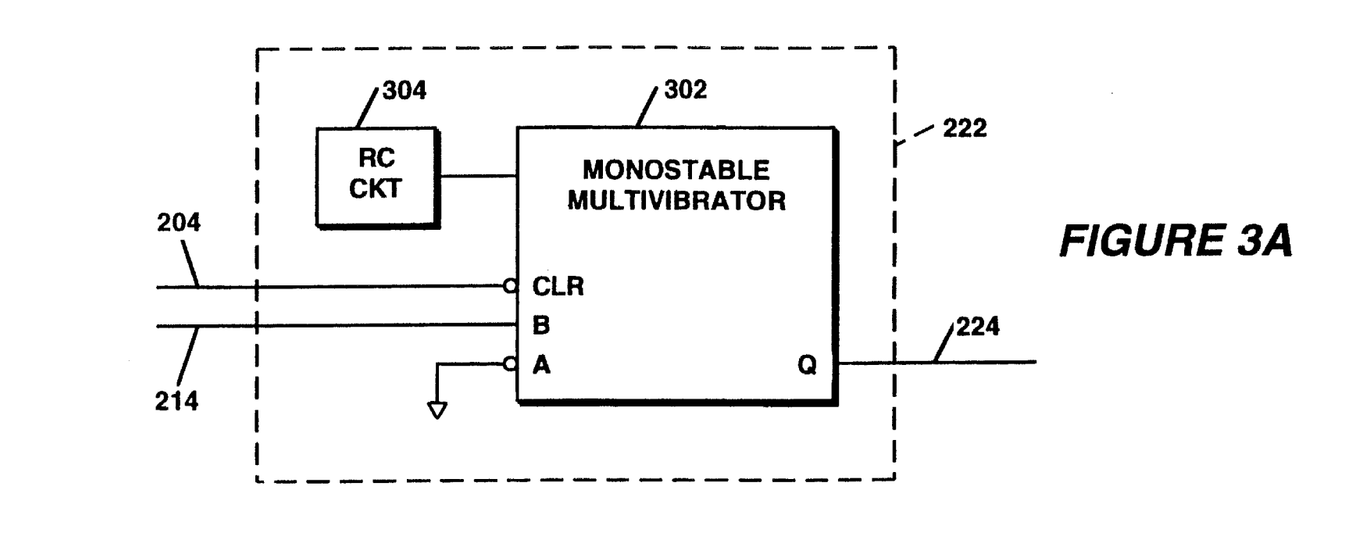
FIG. 3A is a detailed embodiment of the index pulse synthesizer of the signal conditioning unit of FIG. 2.

The jitter attenuated input signal on the line 214 is input to an index pulse synthesizer 222 which adjusts the pulse width of the signal on the line 214 to match the duration of the raw index signal on the line 204. FIG. 3A illustrates an embodiment for the index pulse synthesizer 222. The synthesizer 222 includes a monostable multivibrator 302 (also referred to as a "one-shot") and an RC circuit 304. The monostable multivibrator 302 is available on an integrated circuit such as integrated circuit SN74LS221 available from Texas Instruments.

Referring now to FIGS. 2 and 3A, once the jitter free index signal on the line 214 goes active high (e.g., 5 vdc), the Q output on the line 224 from the multivibrator 302 will also go active high. The signal on the line 224 will then stay high for a time period up to the time set by the resistance and capacitance values of the RC circuit 304, which sets the time constant for the monostable multivibrator 302. While the output signal on the line 224 is high, the monostable multivibrator ignores any transitions of the signal on the line 214. The output signal on the line 224 is cleared by the falling edge of the raw index signal on the line 204 which is input to the clear input of the monostable multivibrator 302.

The resistance and capacitance values of the RC circuit 304 are chosen to provide a time constant whose value is slightly longer than the nominal pulse duration time $T_i$ 102 (FIG. 1A) during which the original index pulse on the line 204 is active high. Selecting the resistance and capacitance values based upon this criteria ensures that the output signal on the line 224 will be cleared by the falling edge of the raw index signal on the line 204. As a result, the pulse duration of the output signal on the line 224 is about the same as that of the raw index pulse on the line 204 (i.e., about equal to $T_i$).

Because of the propagation delays caused by the AND gate 212 and the monostable multivibrator 302, the rising edge of the resultant jitter attenuated index pulse on the line 224 occurs about 70 nanoseconds later than the rising edge of the jitter attenuated data pulse signal on the line 210. Ideally, the rising edge of the index pulse should lead the rising edge of the data pulse by about 40 to 100 nanoseconds. This ensures that the controller 230 has enough response time to properly receive the data pulse signal, following the receipt of the index pulse. A lead time much longer than about 40 to 100 nanoseconds is usually not desirable since it may introduce additional errors. Therefore, the data signal has to be briefly delayed to satisfy this timing relationship.

Figure 3B:
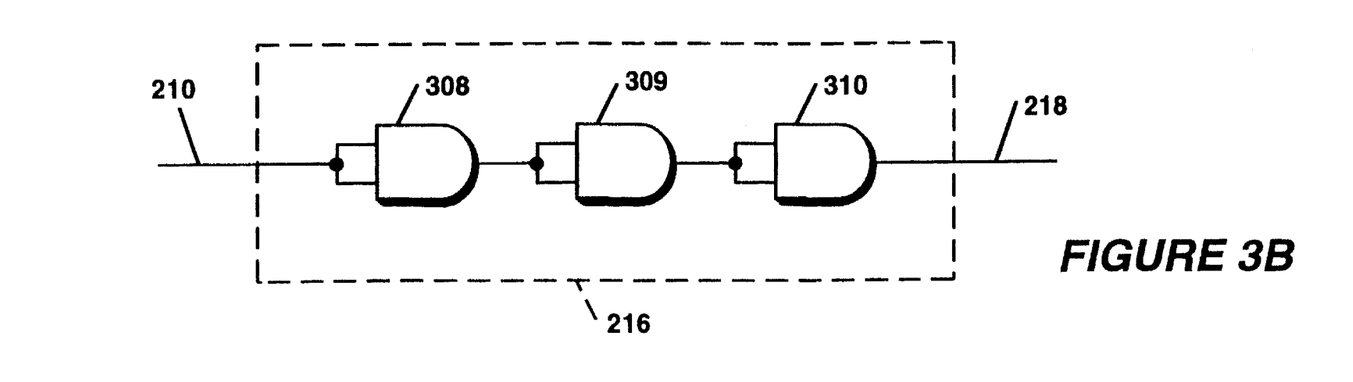
FIG. 3B is a detailed embodiment of the delay circuit of the signal conditioning unit of FIG. 2.

Referring again to FIG. 2, to delay the jitter attenuated data signal on the line 210, the signal is input into a delay circuit 216 which provides a time delayed jitter attenuated data signal on a line 218 to a line driver 220. FIG. 3B illustrates an embodiment for the delay circuit 216. Referring to FIGS. 2 and 3B, since the delay is for a fixed time, the delay may be performed by, for example, passing the jitter attenuated data signal on the line 210 through a series of AND gates 308–310 each configured to act as a buffer having an inherent propagation delay time.

As an example of the delay, if the AND gates 308, 309 are from the integrated circuit model number CB4081B, then each of these gates 308, 309 will provide a propagation delay of about 60–70 nanoseconds, for a combined delay of about 120–140 nanoseconds. If the third AND gate 310 in the delay 216 is from the integrated circuit model number SN74LS08 (i.e., a TTL component), then it will add an additional 10–20 nanoseconds of propagation delay. Hence, the total delay is about 130–160 nanoseconds.

Although obvious, one of ordinary skill will recognize there are many ways to implement a suitable time delay, and therefore, the delay circuit 216 embodiment of FIG. 3B is simply an example of a preferred delay mechanism. In addition, it should be noted that the components within the delay circuit 216 are selected for their propagation delay value and their compatibility with the other electronic components of the signal conditioning unit 200. As a result, a wide variety of devices may be used, such as NAND gates, buffers (inverting and non-inverting), OR gates, or any other combinational logic element. In fact, sequential logic devices (e.g., a counter such as 74LS161) may also be used if a clock source is available.

Returning to FIG. 2, since the encoder 206 and signal conditioner 200 are generally located some distance (e.g., 50 feet) from the controller 230, differential line drivers 220, 226 are used to convert the jitter attenuated signals into differential signals which are then transmitted over twisted pair wires to the controller 230. An example of suitable line drivers 220, 226 includes the RS 422 compatible drivers available on the Texas Instruments integrated circuit model number AM26LS31C.

In order to illustrate the operation of the signal conditioning unit 200 (FIG. 2), an example of the processing of the data and index signals shall now be discussed.

Figure 4A:
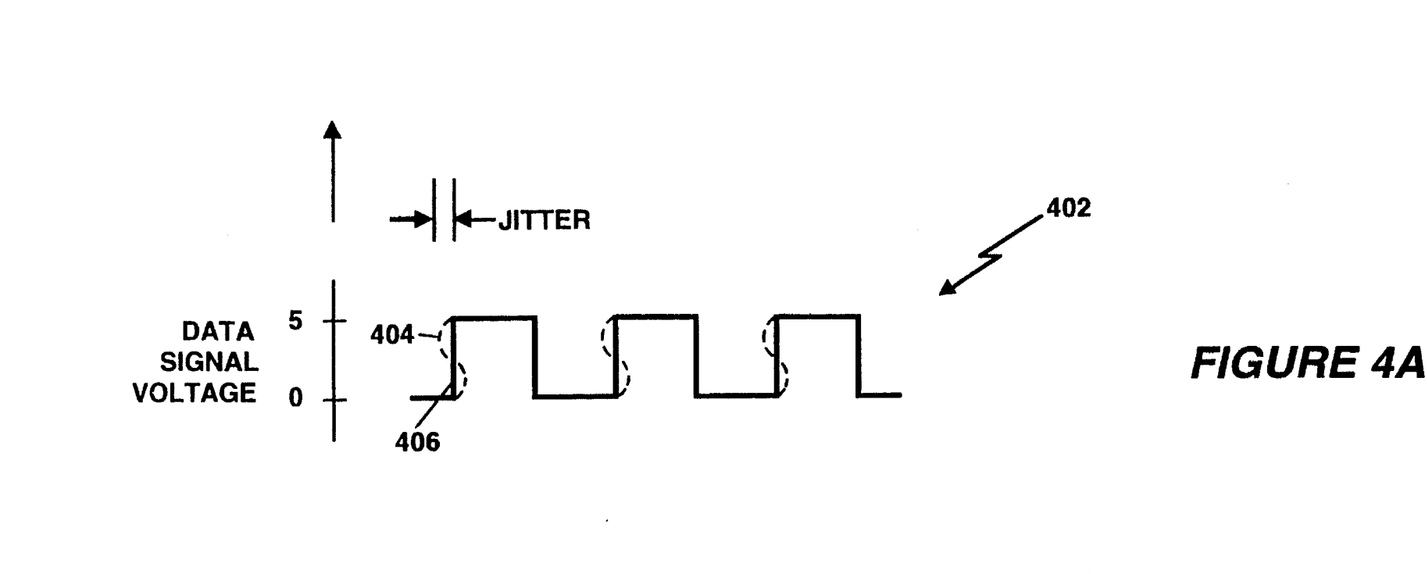
FIG. 4A is a plot of the data signal with jitter.
Figure 4B:
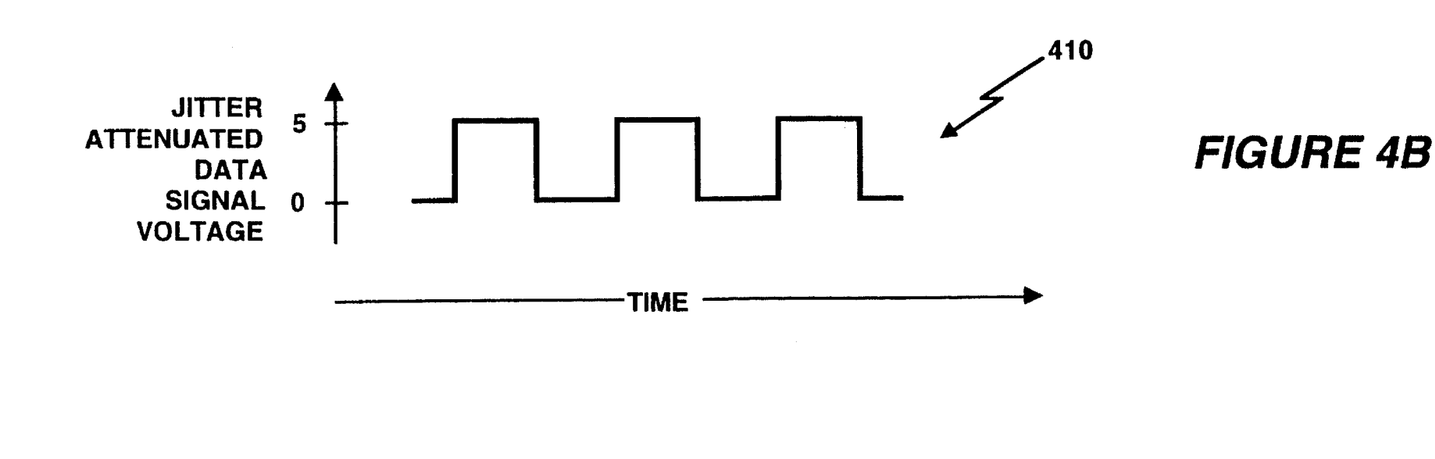
FIG. 4B is a plot of the jitter attenuated data signal output from the signal conditioning unit of FIG. 2.

FIG. 4A is an example of a plot 402 of the data signal on the line 202. Voltage is plotted along the vertical axis and time is plotted along the horizontal axis. The raw data signal includes jitter 404 as shown by the dotted lines on a rising edge 406 of the signal. Since the data signal is input to two inputs 208a, 208b of the AND gate 208 (FIG. 2), the jitter of the signals at each input will be slightly out of phase, and therefore will be "filtered" by the AND gate 208. FIG. 4B is an example of a plot 410 of the jitter attenuated data signal output from the AND gate 208 on the line 210 (FIG. 2). Note, for teaching purposes, the jitter is shown in FIG. 4B as being completely removed, and the signal is an ideal square-wave.

Figure 5A:
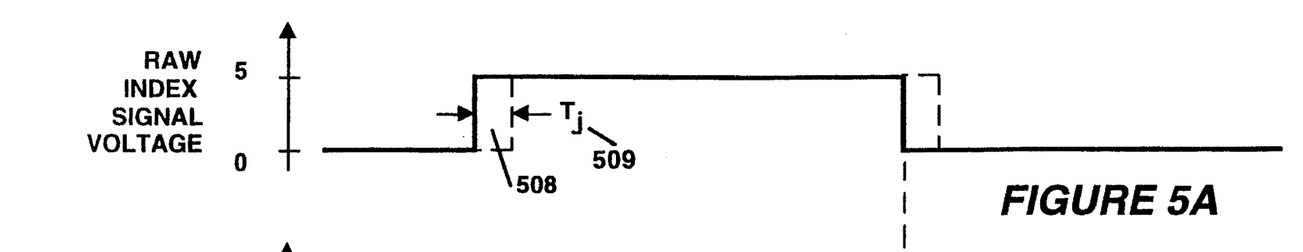
FIG. 5A is a plot of the index signal with jitter.
Figure 5B:
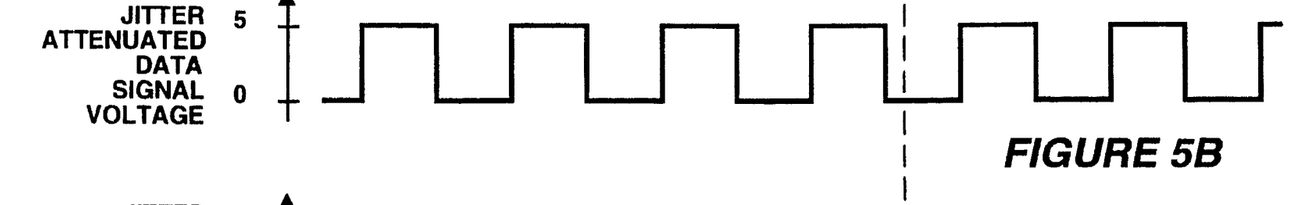
FIG. 5B is a plot of the jitter attenuated data signal which is used in the processing to attenuate the jitter on the index signal shown in FIG. 5A.
Figure 5C:
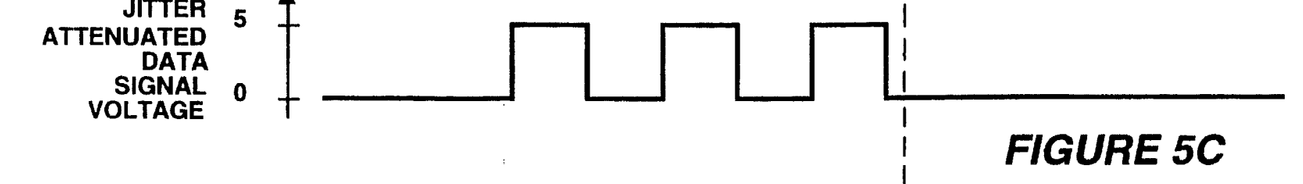
FIG. 5C is a plot of the output from the AND gate 212 in FIG. 2 which receives as inputs the signals illustrated in FIGS. 5A and 5B.
Figure 5D:
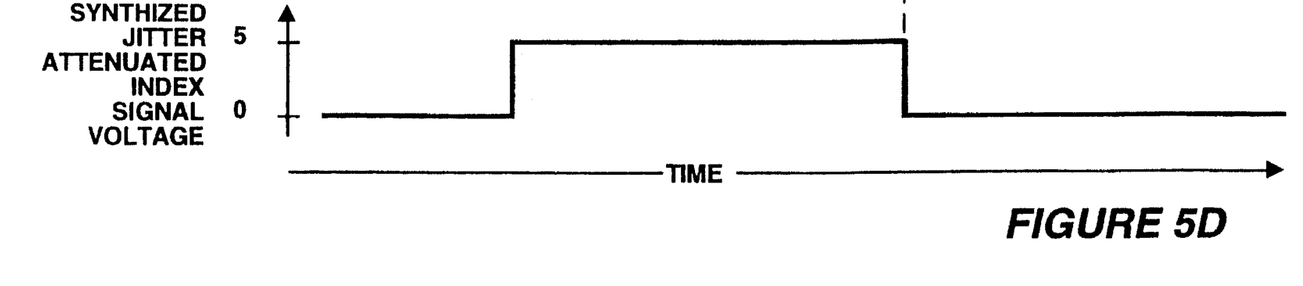
FIG. 5D is a plot of the synthesized jitter attenuated index signal output from the index pulse synthesizer contained within the signal conditioning unit of FIG. 2.

FIG. 5A is an example of a plot 502 of the raw index signal on the line 204 (FIG. 2) as a function of time. Voltage is plotted along the vertical axis and time is plotted along the horizontal axis. As shown, the index signal includes jitter 508 which may shift the rising edge of the index signal within a time range $T_j$ 509, and thus give an erroneous indication of shaft position. FIG. 5B is an example of the jitter attenuated data signal on the line 210. FIG. 5C is a plot of the output signal from the AND gate 212 on the line 214, as a result of ANDING together the raw index signal on the line 204 and the jitter attenuated data signal on the line 210, as shown in FIGS. 5A and 5B respectively. Note to facilitate teaching of the present invention, the jitter is shown as being completely removed in FIGS. 5B and 5C rather than simply attenuated, and the waveforms in both figures are illustrated as ideal squarewaves. FIG. 5D is an example of a plot of the lengthened jitter attenuated index signal on the line 224 from the monostable multivibrator 222 (FIG. 2). Note the falling edge of the synthesized index signal occurs in response to the falling edge of the index signal shown in FIG. 5A. This ensures that the synthesized jitter attenuated index signal has a pulse duration similar to the raw index signal on the line 204 (FIG. 2).

Although the present invention has been discussed in the context of several preferred commercial available integrated circuits, the present invention is clearly not limited to these components. One of ordinary skill will certainly recognize that the jitter attenuation and signal conditioning of the data and index signals according to the present invention may be performed many different ways including using discrete components rather than integrated circuits. In fact, the present invention may even be placed onto a single integrated circuit, such as an ASIC.

In addition, although the embodiment of the present invention disclosed herein performs the signal conditioning in hardware and in the continuous time domain, one of ordinary skill will recognize that the present invention may also be performed in the discrete time domain, and in fact may even be performed in software within the controller 230 (FIG. 2).

The embodiment illustrated herein is an easily manufactured and relatively inexpensive embodiment which improves the characteristics of the data signal and the index signal from a rotary incremental encoder. The present invention attenuates the jitter from the index and data signals, and conditions the signals to ensure the proper timing relationship is maintained.

Although the present invention has been shown and described with respect to a preferred embodiment thereof, it should be understood by those skilled in the art that various other changes, omissions and additions to the form and detail thereof, may be made therein without departing from the spirit and scope of the invention.

What is claimed is:

1. An incremental rotary encoding system which provides digital signals indicative of the position and speed of a rotating shaft, the system comprising:

A. an incremental rotary encoder coupled to the rotating shaft, which generates a digital data signal indicative of shaft position and shaft speed, and a digital index signal which indicates the beginning of a shaft revolution to provide an absolute indication of the angular position of the shaft; and B. means for reducing jitter on at least one of said data signal and said index signal and for providing at least one of a jitter attenuated data signal and a jitter attenuated index signal wherein said means comprises a digital logic gate having a plurality of inputs wherein at least one of the data signal and the index signal has a jitter component and is coupled to an input of said logic gate and wherein an output of the logic gate is a jitter attenuated signal.

2. The incremental rotary encoding system of claim 1 wherein said means for reducing jitter further comprises:

B1. a first combinational logic network which receives said data signal and provides a signal indicative of said jitter attenuated data signal; and B2. a second combinational logic network which receives said jitter attenuated data signal and said index signal and provides a signal indicative of said jitter attenuated index signal.

3. The incremental rotary encoding system of claim 1 wherein said means for reducing jitter comprises:

B1. an AND gate having at least two of its inputs responsive to said data signal and any remaining inputs tied to a digital logic high state.

4. The incremental rotary encoding system of claim 1 wherein said means for reducing jitter comprises:

B1. an AND gate having a first input responsive to said index signal and a second input responsive to a signal indicative of the data signal, the means for reducing jitter generating said jitter attenuated index signal.

5. The incremental rotary encoding system of claim 4 wherein said means for reducing jitter further comprises:

B2. a monostable multivibrator responsive to said jitter attenuated index signal, wherein said monostable multivibrator provides a synthesized jitter attenuated index signal having a pulse duration about equal to a pulse duration of said index signal.

6. The incremental rotary encoding system of claim 5 wherein said means for reducing jitter further comprises:

B3. means for delaying said jitter attenuated data signal a predetermined amount of time.

7. The incremental rotary encoding system of claim 1 wherein said means for reducing the jitter comprises:

B1. a first AND gate having at least two inputs responsive to said data signal and a known propagation delay, wherein said AND gate attenuates the jitter on said data signal and provides a signal indicative of said jitter attenuated data signal;

B2. a second AND gate having a first input responsive to said index signal and a second input responsive to said jitter attenuated data signal, and a known propagation delay, wherein said second AND gate attenuates the jitter on said index signal and provides a signal indicative of said jitter attenuated index signal;

B3. a monostable multivibrator having an input responsive to said jitter attenuated index signal and a known propagation delay, wherein said monostable multivibrator generates a synthesized jitter attenuated index signal which changes digital logic states upon the jitter attenuated index signal changing digital logic states, such that said synthesized jitter attenuated index signal and said index signal have a pulse width of substantially equal duration; and B4. means for delaying said jitter attenuated data signal an amount of time which is greater than a combination of the propagation delays associated with said second AND gate and said monostable multivibrator, to provide a delayed jitter attenuated data signal.

8. The incremental rotary encoding system of claim 7 wherein said means for delaying comprises a plurality of combinational logic devices.

9. An incremental rotary encoding system, comprising:

A. a rotary incremental encoder coupled to a rotating shaft, the encoder providing an index signal indicative of the absolute angular shaft position and a data signal indicative of the relative angular shaft position and the shaft speed;

B. a signal conditioning unit including:

B1. first means responsive to said data signal for attenuating jitter on said data signal and for providing a jitter attenuated data signal indicative therefore, said first means comprising a first digital logic gate having a plurality of inputs, wherein the data signal is electrically connected to each of said plurality of inputs, and wherein an output of the first digital logic gate is said jitter attenuated data signal;

B2. second means responsive to said index signal, for attenuating jitter on said index signal and for providing a jitter attenuated index signal indicative thereof, said second means comprising a second digital logic gate having a plurality of inputs, wherein the jitter attenuated data signal is electrically connected to a first one of the inputs of the second digital logic gate and the index signal is electrically connected to a second one of the inputs of the second digital logic gate, and wherein an output of the second digital logic gate is said jitter attenuated index signal;

B3. means for controlling a duration of a first digital logic state of said jitter attenuated index signal to have about the same duration as the a first digital logic state of said index signal, and for providing a synthesized jitter attenuated index signal indicative thereof, wherein said means for controlling has an associated propagation/processing delay; and B4. a delay circuit which delays said jitter attenuated data signal an amount of time greater than said propagation/processing delay to provide a delayed jitter attenuated data signal.

10. The incremental rotary encoding system of claim 9 wherein the jitter attenuated index signal is in a predetermined digital logic state only when both of said jitter attenuated data signal and said index signal are each in a first digital logic state.

11. The incremental rotary encoding system of claim 10, wherein said first digital logic gate and said second digital logic gate each comprise an AND gate.

12. The incremental rotary encoding system of claim 11, wherein said means for controlling a duration of a first digital logic state of said jitter attenuated index signal comprises:

B9. a monostable multivibrator having a data input responsive to said jitter attenuated index signal, and a clear input which is responsive to said index signal.

13. A method of conditioning an index signal having a jitter component and a data signal having a jitter component from a rotary incremental encoder, comprising the steps of:

A. electrically connecting the data signal to a plurality of inputs of a digital logic gate to attenuate said jitter component of the data signal, an output of the digital logic gate being a jitter attenuated data signal;

B. ANDing together the index signal and said jitter attenuated data signal to remove jitter on the index signal and provide a jitter attenuated index signal; and C. processing said jitter attenuated index signal to provide a synthesized jitter attenuated index signal having a rising edge transition which occurs in response to a rising edge transition of said jitter attenuated index signal, and having a falling edge transition which occurs in response to a falling edge transition of the index signal.

14. The method of signal conditioning of claim 13 further comprising the step of:

D. delaying said jitter attenuated data signal to provide a delayed jitter attenuated data signal.

15. The method of signal conditioning of claim 14 wherein said step of electrically connecting the data signal to a plurality of inputs of a digital logic gate comprises the step of:

A1. electrically connecting the data signal to a plurality of inputs of an AND gate.

16. A rotary encoding system, comprising:
A. a rotary incremental encoder which is coupled to a rotating shaft, and which provides an index signal indicative of the absolute angular shaft position and a data signal indicative of the relative angular shaft position and the shaft speed;
B. a signal conditioning unit including:
   B1. a first AND gate having at least two of its inputs responsive to said data signal and any remaining inputs held in a high digital logic state, wherein said first AND gate provides a jitter attenuated data signal;
   B2. a second AND gate responsive to said jitter attenuated data signal and said index signal, wherein said second AND gate provides a jitter attenuated index signal;
   B3. a monostable multivibrator having a data input responsive to said jitter attenuated index signal, and a clear input responsive to said index signal, wherein upon a rising edge of said jitter attenuated index signal said monostable multivibrator provides a synthesized jitter attenuated digital index signal having a pulse width which is equal to a pulse width of said index signal; and
   B4. a delay circuit comprising a plurality of combinational logic elements which together provide a propagation delay to said jitter attenuated data signal.

17. A signal conditioning unit which receives an index signal indicative of absolute angular shaft position of a rotating shaft and a data signal indicative of the relative angular shaft position and the shaft speed, comprising:
A. means responsive to said data signal, for attenuating jitter on the data signal and for providing a jitter attenuated data signal indicative therefore, said means responsive to the data signal comprising a first digital logic gate having a plurality of inputs, wherein said data signal is electrically connected to each of said plurality of inputs of the first digital logic gate, an wherein an output of the first digital logic gate is said jitter attenuated signal;
B. means responsive to the index signal, for attenuating jitter on the index signal and for providing a jitter attenuated index signal indicative thereof, said means responsive to the index signal comprising a second digital logic gate having a plurality of inputs, wherein said jitter attenuated data signal and said index signal are each electrically connected to at least one of the second digital logic gate inputs, and wherein an output of the second digital logic gate is a jitter attenuated index signal;
C. means for controlling a duration of a first digital logic state of said jitter attenuated index signal so that said first logic state of said jitter attenuated index signal is about the same duration as a first digital logic state of the index signal, and for providing a synthesized jitter attenuated index signal indicative thereof, wherein said means for controlling has an associated propagation/processing delay; and
D. a delay circuit which delays said jitter attenuated data signal an amount of time about equal to said propagation/processing delay to provide a delayed jitter attenuated data signal.

18. The signal conditioning unit of claim 17, wherein the jitter attenuated index signal is in a predetermined digital logic state only when both said jitter attenuated data signal and the index signal are in a first predetermined digital logic state.

19. The signal conditioning unit of claim 18, wherein the first digital logic gate and the second digital logic gate each comprise an AND gate.

20. The signal conditioning unit of claim 19, wherein said means for controlling a first digital logic state of said jitter attenuated index signal comprises:
C1. a monostable multivibrator having a data input responsive to said jitter attenuated index signal, and a clear input which is responsive to the index signal.

21. The signal conditioning unit of claim 19, wherein said delay circuit provides a propagation delay the value of which is large enough to ensure that a rising edge of the synthesized jitter attenuated index signal leads a rising edge of said delayed jitter attenuated data signal by at least about 40 nanoseconds.

22. A signal conditioning unit which receives an index signal indicative of absolute angular shaft position of a rotating shaft and a data signal indicative of the relative angular shaft position and the shaft speed, comprising:
A. means responsive to the index signal and the data signal, for attenuating jitter on the index signal and for providing a jitter attenuated index signal indicative thereof, said means responsive to the index signal comprises a digital logic gate to which the data signal and the index signal are both input, and which has an output which is the jitter attenuated index signal;
B. means for controlling a duration of a first digital logic state of said jitter attenuated index signal so the duration of the first digital logic state of said jitter attenuated index signal is about the same as a duration of a first digital logic state of the index signal, and for providing a synthesized jitter attenuated index signal indicative thereof, wherein said means for controlling has an associated propagation/processing delay; and
C. a delay circuit which delays said jitter attenuated data signal an amount of time about equal to said propagation/processing delay to provide a delayed jitter attenuated data signal.

23. The signal conditioning unit of claim 22, wherein said means responsive to the index signal generates said jitter attenuated index signal only when both the data signal and the index signal are in a first digital logic state.

24. The signal conditioning unit of claim 23, wherein said digital logic gate comprises
an AND gate.

25. The signal conditioning unit of claim 24, wherein said means for controlling comprises:
B1. a monostable multivibrator having a data input responsive to said jitter attenuated index signal, and a clear input which is responsive to the index signal.

* * * * *